(12) United States Patent  (10) Patent No.: US 7,885,668 B2
Montenegro  (45) Date of Patent: *Feb. 8, 2011

(54) DETERMINING THE NETWORK LOCATION OF A USER DEVICE BASED ON TRANSMITTER FINGERPRINTS

(75) Inventor: Gabriel E. Montenegro, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 595 days.

This patent is subject to a terminal disclaimer.

(21) Appl. No.: 11/343,460

(22) Filed: Jan. 31, 2006

(65) Prior Publication Data
US 2007/0178914 A1 Aug. 2, 2007

(51) Int. Cl.
H04W 24/00 (2009.01)
H04W 4/00 (2009.01)
H04M 11/00 (2006.01)

(52) U.S. Cl. ............... 455/456.5; 455/411; 370/338

(58) Field of Classification Search ... 455/456.1–456.5, 455/411, 457, 404, 410, 432.3, 434, 435.1, 455/445; 379/7, 38, 45; 370/310, 310.2, 370/322, 328, 329, 336, 338, 341, 349, 346
See application file for complete search history.

(56) References Cited

U.S. PATENT DOCUMENTS

| 6,202,023 | B1 | 3/2001 | Hancock et al. |
| 6,587,691 | B1* | 7/2003 | Granstam et al. ........ 455/456.1 |
| 6,591,242 | B1* | 7/2003 | Karp et al. .............. 705/2 |
| 7,272,456 | B2* | 9/2007 | Farchmin et al. ........... 700/66 |
| 7,336,670 | B1 | 2/2008 | Calhoun et al. |
| 2002/0176611 | A1* | 11/2002 | Dong .................. 382/124 |
| 2003/0040275 | A1* | 2/2003 | Bridgelall ............... 455/41 |
| 2003/0153328 | A1 | 8/2003 | Booth et al. |
| 2003/0220101 | A1 | 11/2003 | Castrogiovanni et al. |

(Continued)

FOREIGN PATENT DOCUMENTS

EP  0 992 921 A2  4/2000

(Continued)

OTHER PUBLICATIONS

International Search Report from corresponding International Application No. PCT/US2007/001984 filed Jan. 25, 2007.

(Continued)

Primary Examiner—Melody Mehrpour
(74) Attorney, Agent, or Firm—Wolf, Greenfield & Sacks, P.C.

(57) ABSTRACT

Reliably identifying an AP through which a user device is accessing one or more networks, and reliably determining the current network location of the user device. An AP and network location may be reliably identified using a set of transmitter fingerprints unique to the AP or network location, respectively. In response to a user device receiving at least one signal from at least one unknown entity, a transmitter fingerprint set of the at least one entity may be determined from the at least one signal. It then may be determined whether the at least one entity is an AP having an ID known to the user device, and/or whether the current network location is known by the user device. The user device may determine information that may be divulged with the at least one entity based on this determination.

17 Claims, 6 Drawing Sheets

U.S. PATENT DOCUMENTS

| | | |
|---|---|---|
| 2004/0015953 A1 | 1/2004 | Vincent |
| 2004/0027251 A1 | 2/2004 | Sharony |
| 2004/0147270 A1* | 7/2004 | Petrovich ................. 455/456.3 |
| 2005/0033513 A1 | 2/2005 | Gasbarro |
| 2005/0086473 A1 | 4/2005 | Barkley et al. |
| 2005/0148345 A1 | 7/2005 | Kawai et al. |
| 2005/0191992 A1* | 9/2005 | Inoue et al. ................. 455/411 |
| 2005/0245271 A1* | 11/2005 | Vesuna .................... 455/456.1 |
| 2005/0289585 A1* | 12/2005 | Pedlow et al. ................. 725/29 |
| 2006/0031436 A1 | 2/2006 | Sakata et al. |
| 2006/0104224 A1* | 5/2006 | Singh et al. ................. 370/310 |
| 2006/0120517 A1 | 6/2006 | Moon et al. |
| 2007/0025265 A1* | 2/2007 | Porras et al. ................. 370/252 |
| 2007/0176741 A1* | 8/2007 | Montenegro ............... 340/5.83 |
| 2007/0178911 A1 | 8/2007 | Baumeister et al. |

FOREIGN PATENT DOCUMENTS

| | | |
|---|---|---|
| WO | WO 03/075125 A2 | 9/2003 |
| WO | WO 2005/003218 A1 | 4/2005 |
| WO | WO 2005/032189 A1 | 4/2005 |

OTHER PUBLICATIONS

Cisco Systems, "Cisco Unified Wireless Network," product information (10 pages) downloaded on Nov. 16, 2005 from http://www.cisco.com/en/US/products/ps6386/prodbrochure.

Feuerstein, M., "The complex world of wireless E911," 3-page article dated Aug. 1, 2004 downloaded on Dec. 22, 2005 from http://mrtmag.com.

Hall, J. et al., "Detection of Transient in Radio Frequency Fingerprinting Using Signal Phase," Carleton University, School of Computer Science, Ottawa, Canada.

Hall, J. et al., "Enhancing Intrusion Detection in Wireless Networks Using Radio Frequency Fingerprinting (Extended Abstract)," Carleton University, School of Computer Science, Ottawa, Canada.

Lindeman, J. et al., "Review: Wireless LAN Security Monitors (Part 2 of 2)," 6-page article dated Mar. 9, 2004 downloaded on Dec. 22, 2005 from http://www.securitypipeline.com.

Roodyn, N., "Ion Awareness," 18-page paper downloaded on Nov. 16, 2005 from http://msdn.microsoft.com/en-us/dntablet.

Taheri, A. et al., "Location Fingerprinting on Infrastructure 802.11 Wireless Local Area Networks (WLANs) using Locus," *Proceedings of the 29$^{th}$ Annual IEEE International Conference on Local Computer Networks* (*LCN'04*) 0742-1303/04, 8 pages.

Yao, T. et al., "Ion Awareness Service," 8-page paper downloaded on Nov. 16, 2005 from http://msdn.microsoft.com/library/en-us/dnlong.

* cited by examiner

DETERMINING THE NETWORK LOCATION OF A USER DEVICE BASED ON TRANSMITTER FINGERPRINTS

BACKGROUND

A basic problem with today's highly portable and mobile computers is how to identify a computer's current network location. As used herein, a "network location" of a computer or other device (e.g., a network device and/or user device) is the location of the device with respect to one or more communications networks. A network location of a device is not the same thing as the geographical or physical location of the device, although the network location may be indicative to some extent of the geographical or physical proximity of the device.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing.

A network (e.g., any of networks 104, 106 and 108 described below) may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

For a user device that is accessing one or more networks through a wireless transmission medium (e.g., using radio frequency (RF) technologies), the network location may be based on the identity of the AP (i.e., wireless access point such as, for example, a wireless router and/or WiFi AP) that provides the user device access to the one or more networks.

The network location of a user device has profound implications with respect to how the user device and its software will behave, particularly when the user device is accessing one or more networks through an AP using wireless technologies (e.g., WiFi/IEEE 802.11). Based on the network location of the user device and the type of network access implied by this network location, applications on the user device modify their behavior and expectation to better use whatever resources are available (bandwidth, local facilities such as printers, specific mode of communication, etc.). For example, applications can be configured to behave according to their network location as determined using Network Location Awareness (NLA) technologies available from Microsoft Corporation of Redmond, Wash. The network location of a user device has implications with respect to changes in three primary areas: trust; privacy; and security. There is more trust in the infrastructure available within a corporate or residential location than in an unfamiliar setting such as a public hotspot. With respect to privacy, it is well known that as a user device arrives at a new network location and attempts to discover the resources available, it volunteers sensitive information such as user name, usual server, buddy lists, etc. With respect to security, in some network locations, the user device's firewall rules may be relaxed or completely deactivated, while in other network locations they are activated to protect against the threats in unknown environments.

In home environments, for example, user devices may be configured to be able to share content within the local (typically wireless) network, to easily exchange pictures, music, videos, to easily set up media streams between different nodes and devices, to share printers and files, etc. In contrast, in a public hotspot environment, this functionality should be turned off, and the user device should operate in a much more closed and protected fashion. Thus, there is constant tension between functionality and security: at home the tradeoff is to enable richer functionality while retaining some secure posture, whereas the secure posture must be increased to a maximum in potentially hostile or unknown environments such as WiFi hotspots.

Because of these competing interests, it is imperative that the identification of a network location be reliable. For example, if an attacker succeeds in making a user device believe that the user device is in a familiar and well-known (e.g., "secure") network location, the user device may relax its protection or leak more information than it should, increasing the possibility of attack. Network location is sometimes determined using malleable (i.e., spoofable) identifiers in the infrastructure. For example, an entity (e.g., an AP or other network device connected to a network or a mobile user device not connected to a network) could wirelessly communicate with a user device, identifying itself to the user device using the MAC address of an AP familiar to the user device, thereby gaining the trust of the user device. The user device then may proceed to share information with the entity not knowing that the entity is an impostor. Malleable identifiers like MAC addresses can be easily spoofed, which is an increasing cause for concern as the role of network location in determining application behavior grows.

In some cases, network location may be inferred from verifiable sources of information. For example, within a corporate site, it is usually possible to obtain such assurance cryptographically (e.g., by authenticating the Domain Controller, or the AAA infrastructure via an IEEE 802.1x exchange). However, in non-corporate environments, such as in residences, the network location is sometimes inferred via the aforementioned malleable identifiers.

Thus, a need exists for a more reliable way for a user device to identify its current network location and/or the identity of an AP in its vicinity, particularly when other security measures such as authentication are not available.

SUMMARY

This Summary provides an illustrative context for aspects of the invention, in a simplified form. It is not intended to be used to determine the scope of the claimed subject matter. Aspects of the invention are described more fully below in the Detailed Description.

Described herein are systems and methods for reliably identifying a network location of a user device and/or for reliably identifying an AP through which a user device is accessing one or more networks, and reliably determining the network location of the user device based on the identification of the AP, for example, when other security measures such as authentication are not available. An AP and network location may be reliably identified using a set of transmitter fingerprints unique to the AP. As used herein, a set of transmitter fingerprints is one or more transmitter fingerprints.

As used herein, a "transmitter fingerprint" is a set of one or more physical properties (and/or properties derived therefrom) of an electromagnetic signal generated and transmitted by a radio transmitter, the set of properties uniquely distinguishing the transmitter from other transmitters. Such a transmitter may be part of a transceiver, or a component separate and distinct from a receiver. The set of one or more physical properties typically includes properties of the transient portion of the signal. For example, each property may include or be derived from the frequency, phase and amplitude or other electromagnetic property of the transient portion. A signal generated by a radio transmitter exhibits certain characteristics, particularly in the transient period, that reliably distinguish the source transmitters from other transmitters, even those made by the same manufacturer. These characteristics can be captured in a transmitter fingerprint.

In response to a user device receiving at least one signal from an unknown entity (i.e., unknown at the time of the reception of the signal) at a current location, a transmitter fingerprint of the entity may be determined from the at least one signal. If one or more other entities are within range of the user device, the transmitter fingerprint(s) of these one or more entities may be determined. The transmitter fingerprint(s) determined for the current network location may constitute a transmitter fingerprint set of the current network location. It then may be determined the current network location is a network location known to the user device based, at least in part, on the determined transmitter fingerprint. This determination may include determining whether one or more of the entities is an AP having an ID known to the user device based at least in part on the transmitter fingerprint set. The user device may determine information that may be divulged with the one or more entities based on this determination, and communications may be exchanged with the one or more accordingly.

A fingerprint table (or other type of data structure) including a plurality of entries may be provided, each entry including a transmitter fingerprint set of a network location. Determining whether a current network location is a network location known to the user device may include comparing the determined transmitter fingerprint set for the current network location with the transmitter fingerprint set(s) of one or more fingerprint table entries. A match may be determined if the similarity between the determined transmitter fingerprint set and the transmitter fingerprint set of one of the entries is greater than a predefined threshold. Further, a match may be determined if at least one transmitter fingerprint (e.g., all) of the transmitter fingerprint set of any entry matches at least one transmitter fingerprint of the one or more entities at the current network location of the user device. Finding a match means that the current network location is a network location known to the user device.

In some embodiments, the fingerprint table may be used to determine whether one or more entities within range at a current network location is an AP having an ID known to the user device. This determination may include comparing the determined transmitter fingerprint of an entity at the current network location to one or more of the transmitter fingerprints of the transmitter fingerprint set(s) of one or more of the fingerprint table entries. In some embodiments, a separate table or other type of data structure may be maintained, where each entry in the table includes a transmitter fingerprint of an AP, and this table may be used to determine whether one or more entities at the current network location of a user device are known to the user device.

A user interface may be provided that enables a user to control: when a transmitter fingerprint set is determined; when it is compared with fingerprint table entries; and/or when it is recorded. The user interface also may notify the user when a fingerprint set determination, comparison or recording is going to be made, and allow the user to decide if the action is to be performed. The user interface also may enable the user to set the threshold for a transmitter fingerprint match.

In an embodiment of the invention, a user device processes at least one signal received from at lease one entity over a wireless transmission medium. A transmitter fingerprint set from the at least one signal is determined. Based at least in part on the transmitter fingerprint set, it is determined whether a current network location of the user device is a network location known by the user device.

In an aspect of this embodiment, information to divulge in one or more communications to transmit to one or more entities of the at least one entity is determined based, at least in part, on the determination of whether the current network location is a network location known by the user device.

In another aspect of this embodiment, determining whether a current network location of the user device is a network location known by the user device includes determining that the current network location is a network location known to the user device, and determining information to divulge includes determining the information based, at least in part, on the known network location.

In another aspect of this embodiment, determining whether a current network location of the user device is a network location known by the user device includes determining, based at least in part on the transmitter fingerprint set, that one of the at least one entity is a wireless access point having an identity known to the user device:

In yet another aspect of this embodiment, information to divulge in one or more communications transmitted to the wireless access point is determined based, at least in part, on the identity of the wireless access point.

In another aspect of this embodiment, determining whether a current network location of the user device is a network location known by the user device includes determining whether the transmitter fingerprint set matches any transmitter fingerprint set known by the user device.

In another aspect of this embodiment, determining whether a current network location of the user device is a network location known by the user device includes accessing an information source that includes at least one entry, each entry specifying an identity of a network location and a transmitter fingerprint set of the network location, and comparing the determined transmitter fingerprint set to the transmitter fingerprint set of one or more of the at least one entry.

In another aspect of this embodiment, the comparing includes determining, for each of the one or more entries, whether a similarity between the determined transmitter fingerprint set and the transmitter fingerprint set of the entry exceeds a predefined threshold.

In yet another aspect of this embodiment, the comparing includes, for each of the one or more entries, determining whether at least one transmitter fingerprint of the determined transmitter fingerprint set matches at least one transmitter fingerprint included in the entry.

In another aspect of this embodiment, the comparing includes, for each of the one or more entries, determining whether all of the transmitter fingerprints of the determined transmitter fingerprint set matches all of the transmitter fingerprints included in the entry.

One or more acts of the preceding embodiment and/or one or more aspects thereof may be implemented using a computer or other type of computational system.

Aspects of this embodiment of the invention include any suitable combination of the foregoing aspects and/or variations thereof.

In another embodiment of the invention, a computer program is provided that includes instructions that, as a result of being executed by a computer, instruct the computer to perform the method of the embodiment of the invention described in the preceding paragraphs and/or one or more aspects thereof described in the preceding paragraphs.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system for processing, for a user device, at least one signal received from at least one entity over a wireless transmission medium is provided. The system includes a fingerprint determination module to determine a transmitter fingerprint set from the at least one signal, and an identification module to determine, based at least in part on the transmitter fingerprint set, whether a current network location of the user device is a network location known by the user device.

In an aspect of this embodiment, the system includes at least one application operative to determine information to divulge in one or more communications transmitted to one or more of the at least one entity based, at least in part, on the determination of whether the current network location is a network location known by the user device.

In another aspect of this embodiment, the at least one application is operative such that, if the identification module determines the that the current network location is a network location known to the user device, the at least one application determines information to share with the entity based, at least in part, on the known network location.

In another aspect of this embodiment, the identification module is operative to determine, based at least in part on the transmitter fingerprint set, that one of the at least one entity is a wireless access point having an identity known to the user device.

In another aspect of this embodiment, the system includes at least one application operative to determine information to divulge in one or more communications transmitted to the wireless access point based, at least in part, on the identity of the wireless access point.

In yet another aspect of this embodiment, the identification module is operative to determine whether the transmitter fingerprint set matches any transmitter fingerprint set known by the user device.

In another aspect of this embodiment, the identification module is operative to access an information source that includes at least one entry, each entry specifying an identity of a network location and a transmitter fingerprint set of the network location, and to compare the determined transmitter fingerprint set to the transmitter fingerprint set of one or more of the at least one entry.

In another aspect of this embodiment, the identification module is operative to determine, for each of one or more entries, whether a similarity between the determined transmitter fingerprint and the transmitter fingerprint set of the entry exceeds a predefined threshold.

In yet another aspect of this embodiment, the identification module is operative to determine, for each of the one or more entries, whether at least one transmitter fingerprint of the determined transmitter fingerprint set matches at least one transmitter fingerprint included in the entry.

In another aspect of this embodiment, the identification module is operative to determine, for each of the one or more entries, whether all of the transmitter fingerprints of the determined transmitter fingerprint set match all of the transmitter fingerprints included in the entry.

Aspects of this embodiment of the invention include any suitable combination of the foregoing aspects and/or variations thereof.

In another embodiment of the invention, a user device processes at least one signal transmitted on a wireless transmission medium from an entity, an identity of the entity being unknown to the user device at a time at which the at least one signal is received. A transmitter fingerprint from the at least one signal is determined. Based at least in part on the transmitter fingerprint, it is determined whether the entity is a wireless access point having an identity known by the user device.

In an aspect of this embodiment, information to divulge in one or more communications transmitted to the entity is determined based, at least in part, on the determination of whether the entity that transmitted the signal is a wireless access point having an identity known by the user device.

In another aspect of this embodiment, determining whether the entity is a wireless access point having an identity known by the user device includes determining that the entity is a wireless access point having an identity known to the user device, and determining information to divulge includes determining the information based, at least in part, on the identity.

In yet another aspect of this embodiment, determining whether the entity is a wireless access point having an identity known by the user device includes determining that the entity is a wireless access point having an identity known to the user device. Further, a network location of the user device is determined based at least in part on the identity.

In another aspect of this embodiment, determining whether the entity is a wireless access point having an identity known by the user device includes determining information to divulge in one or more communications transmitted to the wireless access point based, at least in part, on the determined network location.

In another aspect of this embodiment, determining whether the entity is a wireless access point having an identity known by the user device includes determining whether the transmitter fingerprint matches any transmitter fingerprint known by the user device.

In another aspect of this embodiment, determining whether the entity is a wireless access point having an identity known by the user device includes accessing an information source that includes at least one entry, each entry specifying an identity of a wireless access point and a transmitter fingerprint of the wireless access point, and comparing the determined transmitter fingerprint to the transmitter fingerprint of one or more of the at least one entry.

In another aspect of this embodiment, the comparing includes determining, for each of one or more entries, whether a similarity between the determined transmitter fingerprint and the transmitter fingerprint of the entry exceeds a predefined threshold.

One or more acts of the preceding embodiment and/or one or more aspects thereof may be implemented using a computer or other type of computational system.

Aspects of this embodiment of the invention include any suitable combination of the foregoing aspects and/or variations thereof.

In another embodiment of the invention, a computer program is provided that includes instructions that, as a result of being executed by a computer, instruct the computer to perform the method of the embodiment of the invention described in the preceding paragraphs and/or one or more aspects thereof described in the preceding paragraphs.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system is provided that is operative to perform the method of the embodiment of the invention described in the preceding paragraphs and/or one or more aspects thereof described in the preceding paragraphs.

In another embodiment of the invention, a user of a user device is assisted in recording a transmitter fingerprint set of a network location. A user interface is provided to enable the user to initiate recording the transmitter fingerprint set of the network location.

In an aspect of this embodiment, providing a user interface includes displaying a window to the user that indicates to the user an option of recording the transmitter fingerprint set of the network location.

In another aspect of this embodiment, a user input indicating to record the transmitter fingerprint set of the network location is received. The transmitter fingerprint set is recorded in response to the input.

In another aspect of this embodiment, recording the transmitter fingerprint set includes storing the transmitter fingerprint set in an information source configured to store transmitter fingerprint sets of network locations.

In yet another aspect of this embodiment, the user interface is provided at least in part in response to receiving a signal.

In another aspect of this embodiment, it is determined that an information source configured to store one or more entries representing transmitter fingerprint sets does not include any entries, and the user interface is provided at least in part in response to the determination that the information source does not include any entries.

In another aspect of this embodiment, a transmitter fingerprint set of the network location is determined, and an information source storing one or more transmitter fingerprint sets of one or more network locations is accessed, and it is determined that the determined transmitter fingerprint set does not match any of the transmitter fingerprint sets stored in the information source. Further, the user interface is provided in response to this determination.

In yet another aspect of this embodiment, a transmitter fingerprint set of the network location is determined, and an information source storing one or more transmitter fingerprint sets of one or more network locations is accessed. Further, it is determined that the determined transmitter fingerprint set matches one of the transmitter fingerprint sets stored in the information source to an extent that is above a matching threshold and below a re-record threshold, and the user interface is provided in response to this determination.

In another aspect of this embodiment, the user interface is provided at least in part in response to a lapsing of a particular amount of time since a predetermined time.

One or more acts of the preceding embodiment and/or one or more aspects thereof may be implemented using a computer or other type of computational system.

Aspects of this embodiment of the invention include any suitable combination of the foregoing aspects and/or variations thereof.

In another embodiment of the invention, a computer program is provided that includes instructions that, as a result of being executed by a computer, instruct the computer to perform the method of the embodiment of the invention described in the preceding paragraphs and/or one or more aspects thereof described in the preceding paragraphs.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system is provided that is operative to perform the method of the embodiment of the invention described in the preceding paragraphs and/or one or more aspects thereof described in the preceding paragraphs.

In another embodiment, a system for assisting a user of a user device in recording a transmitter fingerprint of a wireless access point is provided. The system includes a user interface to enable the user to initiate recording the transmitter fingerprint of the wireless access point.

In an aspect of this embodiment, the user interface is operative to display a window to the user that indicates to the user an option of recording the transmitter fingerprint of the wireless access point.

In another aspect of this embodiment, the user interface is further operative to receive a user input indicating to record the transmitter fingerprint of the wireless access point, and the system further includes a recording module to record the transmitter fingerprint in response to the input.

In another aspect of this embodiment, the recording module is operative to store the transmitter fingerprint in an information source configured to store transmitter fingerprints of wireless access points.

In yet another aspect of this embodiment, the user interface is operative to enable the user to initiate recording the transmitter fingerprint in response to the user device receiving a signal from the wireless access point.

In another aspect of this embodiment, the system further includes a checking module operative to determine that an information source configured to store one or more entries representing one or more transmitter fingerprints does not include any entries, and the user interface set is operative to enable the user to initiate recording the transmitter fingerprint at least in part in response to the determination that the information source does not include any entries.

In another aspect of this embodiment, the system includes a fingerprint determination module to determine a transmitter fingerprint of the wireless access point, and an identification module operative to access an information source storing one or more transmitter fingerprints of one or more wireless access points, and operative to determine that the determined transmitter fingerprint does not match any of the transmitter fingerprints stored in the information source. Further, the user interface is operative to enable the user to initiate the recording of the transmitter fingerprint at least in part in response to the determination that the determined transmitter fingerprint does not match any of the transmitter fingerprints stored in the information source.

In another aspect of this embodiment, the system includes a fingerprint determination module to determine a transmitter fingerprint of the wireless access point is provided, and an identification module operative to access an information source storing one or more transmitter fingerprints of one or more wireless access points, and operative to determine that the determined transmitter fingerprint matches one of the transmitter fingerprints stored in the information source to an extent that is above a matching threshold and below a re-record threshold. Further, the user interface is operative to enable the user to initiate recording the transmitter fingerprint at least in part in response to the determination that the determined transmitter fingerprint matches one of the transmitter fingerprints stored in the information source to an extent that is above the matching threshold and below the re-record threshold.

In yet another aspect of this embodiment, the user interface is operative to enable the user to initiate recording the transmitter fingerprint at least in part in response to a lapsing of a particular amount of time since a predetermined time.

In another embodiment of the invention, a computer-readable medium is provided. The computer-readable medium has computer-readable signals stored thereon that define a data structure including at least one entry specifying a transmitter fingerprint set of a network location, and the data structure is operative to be accessed by a user device to determine an identity of a network location.

In an aspect of this embodiment, the at least one entry corresponds to a particular wireless access point.

In another aspect of this embodiment, the at least one entry includes a plurality of entries, each entry corresponding to a respective network location and specifying a transmitter fingerprint set of the respective network location.

In another aspect of this embodiment, the at least one entry includes an identifier indicative of a network location to which the at least one entry corresponds.

In another aspect of this embodiment, the identifier is indicative of a particular wireless access point.

In another aspect of this embodiment, the at least one entry includes an identifier indicative of a particular wireless access point.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Although several embodiments of the invention are primarily directed to the transmitter fingerprint sets of a network location, the invention is not so limited. Embodiments of the invention may be applied to determining and recording the transmitter fingerprints of wireless access points and/or other types of network devices such as, for example, user devices in the context of peer-to-peer wireless communication between user devices without use of a wireless access point, and determining the identity of wireless access points and other types of network devices based on transmitter fingerprints.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
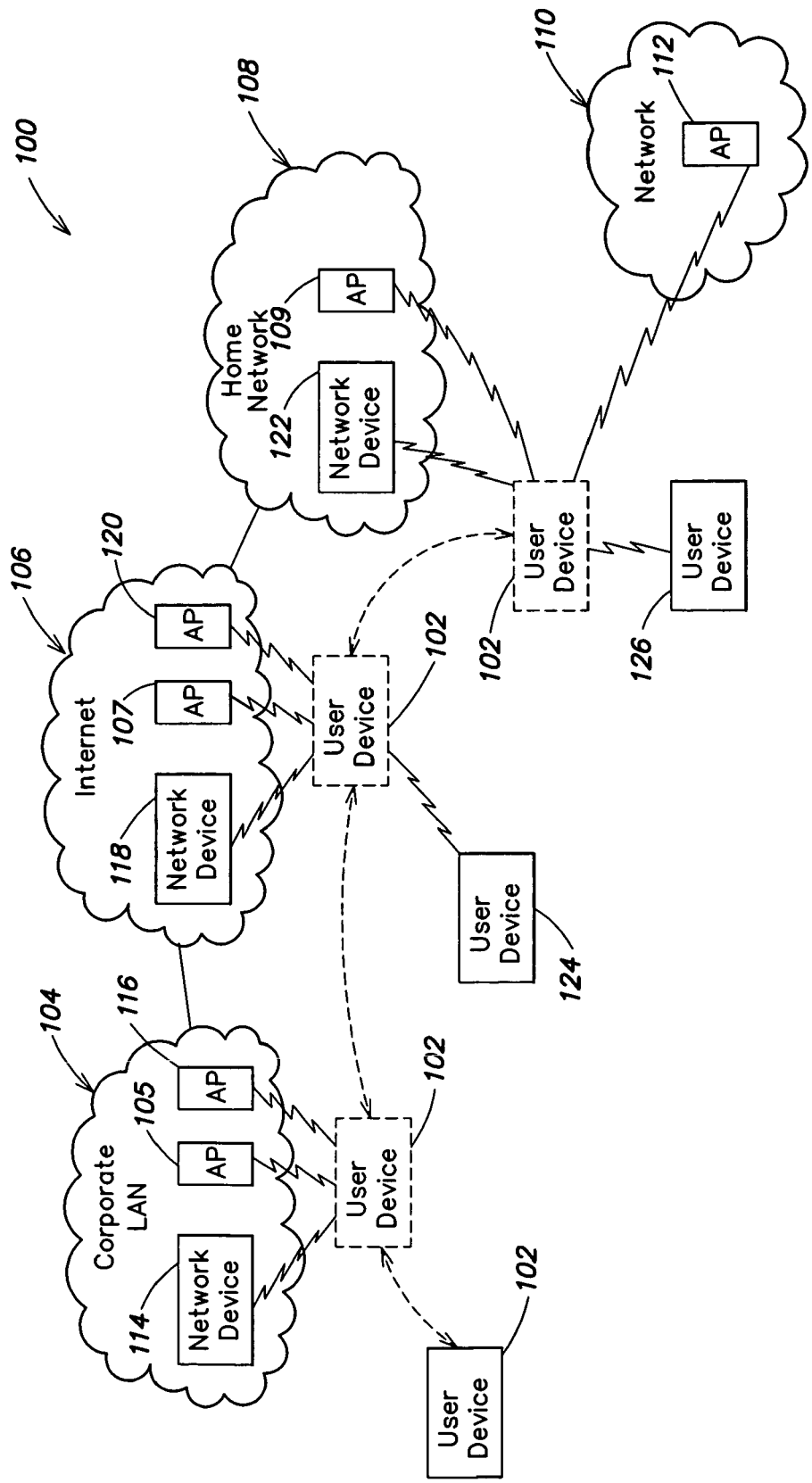
FIG. 1 is a block diagram illustrating an example of a network system on which one or more embodiments of the system may be implemented.

FIG. 1 is a block diagram illustrating an example of a network system 100 on which one or more embodiments of the system may be implemented. System 100 may include any of: user devices 102, 124, 126; other user devices; corporate LAN 104; Internet 106; home network 108; other networks; APs 105, 107, 109, 116 and 120; other APs; network devices 114, 118, 122, other components; or any suitable combination of the foregoing. It should be appreciated that networks 104, 106 and 108 may be considered parts of one network.

As shown in FIG. 1, user device 102 may be a mobile user device which is in transmission range of one or more APs, network devices and/or user devices at different times. For example, user device may be within range of APs 105 and 106 and network device 114 of corporate LAN 104 while situated at a first network location, may be within range of APs 107 and 120 and network device 118 of Internet 106 and user device 124 while situated at another network location, and may be within range of AP 109 and network device 122 of home network 108 and user device 126 at another network location. Thus, at any of a plurality network locations, user device 102 may receive electromagnetic signals from one or more entities, the identities of these entities being unknown at a time at which an initial signal from the entity is received. As will be described in more detail below, at each network location, a transmitter fingerprint set may be determined based on the signal(s) received from one or more of the entities, and a network location of the user device and/or an identity of one or more of the entities may be determined at each network location based on the transmitter fingerprint set determined for the location.

Figure 2:
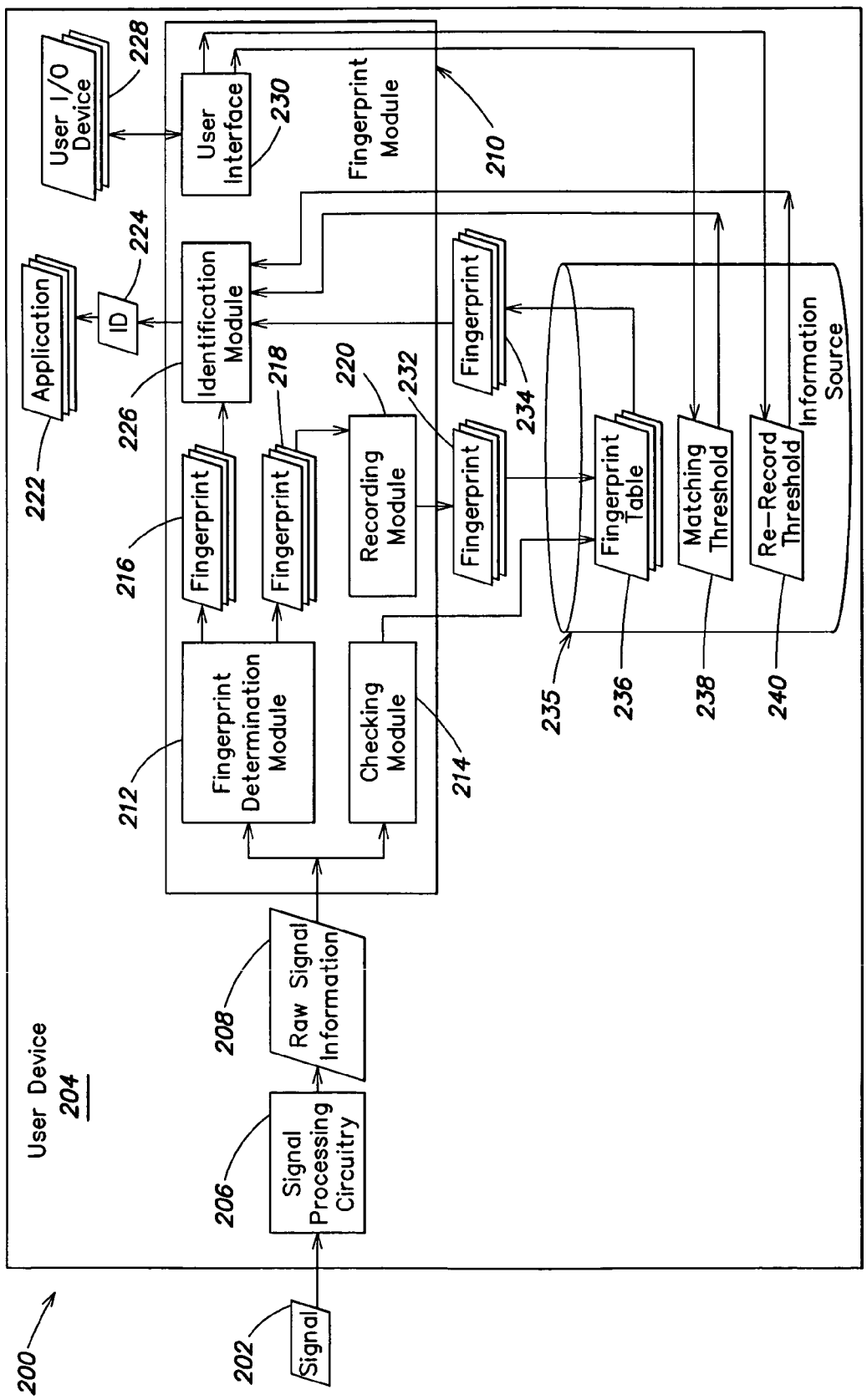
FIG. 2 is a block diagram illustrating an example of a system for recording transmitter fingerprint sets and determining a network location and/or entity ID based at least in part on a transmitter fingerprint set, according to some embodiments of the invention.

FIG. 2 is a block diagram illustrating an example of a system 200 for recording a transmitter fingerprint set, and for determining a current network location and/or determining an identity of an entity based at least in part on a transmitter fingerprint set determined from at least one signal transmitted from at least one entity, according to some embodiments of the invention. System 200 is merely an illustrative embodiment of a system for recording a transmitter fingerprint set, determining a current network location and/or determining an identity of an entity based at least in part on a set of transmitter fingerprints, and is not intended to limit the scope of the invention. Any of numerous other implementations of such a system, for example, variations of system 200, are possible and are intended to fall within the scope of the invention.

System 200 may include a user device 204, which may include any of: signal processing circuitry 206; fingerprint module 210; information source 235; other components; or any suitable combination of the foregoing. Signal processing circuitry 206 may be configured to receive a transmitted signal 202 and produce raw signal information 208. Circuitry 206 may include a network interface card (NIC), which may include one or more transmitters and other circuitry necessary for processing received electromagnetic signals.

Typical signal processing circuitry of known user devices does not pass raw signal information to other components (e.g., software components) of the user device. Accordingly, in some embodiments of the invention, circuitry 206 may include other components in addition to a typical NIC. For example, the Cognio RF Spectrum Sniffer available from Cognio Corporation may be included in circuitry 206 and used in conjunction with a NIC to produce raw signal information 208. For example, the Cognio RF Spectrum Sniffer may be used in its Universal Serial Bus (USB) dongle form in which the sniffer may be plugged into a USB port of the user device 200. In other embodiments, the NIC itself may be configured to send signal information 208 to fingerprint module 210 and/or other components of user device 204.

Signal information 208 may be the signal 202 itself or information extracted from signal 202 that is closer (i.e., more raw) in form to the original signal 202 than the form of information typically extracted from a signal and passed to components of a user device. For example, raw signal information 208 may be in analog form, whereas typically the information passed from signal processing circuitry of a user device to other components is digital information converted from the received analog signal using an analog-to-digital converter (ADC).

Fingerprint module 210 may include any of: fingerprint determination module 212; checking module 214; identification module 226; user interface 230; recording module 220; other components; or any suitable combination of the foregoing. Embodiments of the invention may perform two primary functions: recording transmitter fingerprint sets; and identifying network locations and/or entities (e.g., APs) based on transmitter fingerprint sets. Various components of fingerprint module 210 may be used in one or both of these functions.

Fingerprint module 210 may be configured to record the transmitter fingerprint set of a network location: the first time the user visits the network location; the first time the user uses an AP at the network location; periodically; and/or in response to one or more events. Recording a transmitter fingerprint set at a network location may include recording the transmitter fingerprint(s) of the one or more entities (e.g., APs, other network devices, user devices, independent of any network, etc.) within range of the user device at the network location. By recording the transmitter fingerprint set of a network location, a user device can then later determine the identity of current network location by comparing the transmitter fingerprint set of the current network location to the transmitter fingerprint sets that it has previously recorded. One or more applications on the user device can exchange information with resources on one or more networks accessible at the network location including an AP of a network, based on the determined network location.

As mentioned above, fingerprint module 210 may record a transmitter fingerprint set of a network location in response to one or more events. For example, in response to receiving raw signal information 208 derived from signal 202, checking module 214 may check to determine whether there are any entries in fingerprint table 236. If there are no entries in the table, meaning that no transmitter fingerprint sets are currently stored, then fingerprint determination module 212 may determine a transmitter fingerprint set 218 and recording module 220 may store the set 232 in fingerprint table 236.

Fingerprint determination module 212 may be configured to determine a transmitter fingerprint set from raw signal information 208 using any of a variety of known techniques, for example, as described in "Enhancing Intrusion Detection in Wireless Networks using Radio Frequency Fingerprinting (Extended Abstract)" by Jeyanthi Hall, Michel Barbeau and Evangelos Krankais, Internet and Information Technology (CIIT), St. Thomas, U.S. Virgin Islands, November 2004, (hereinafter, the "Hall Paper"). Determining a transmitter fingerprint will now be described briefly with reference to FIG. 3.

Figure 3:
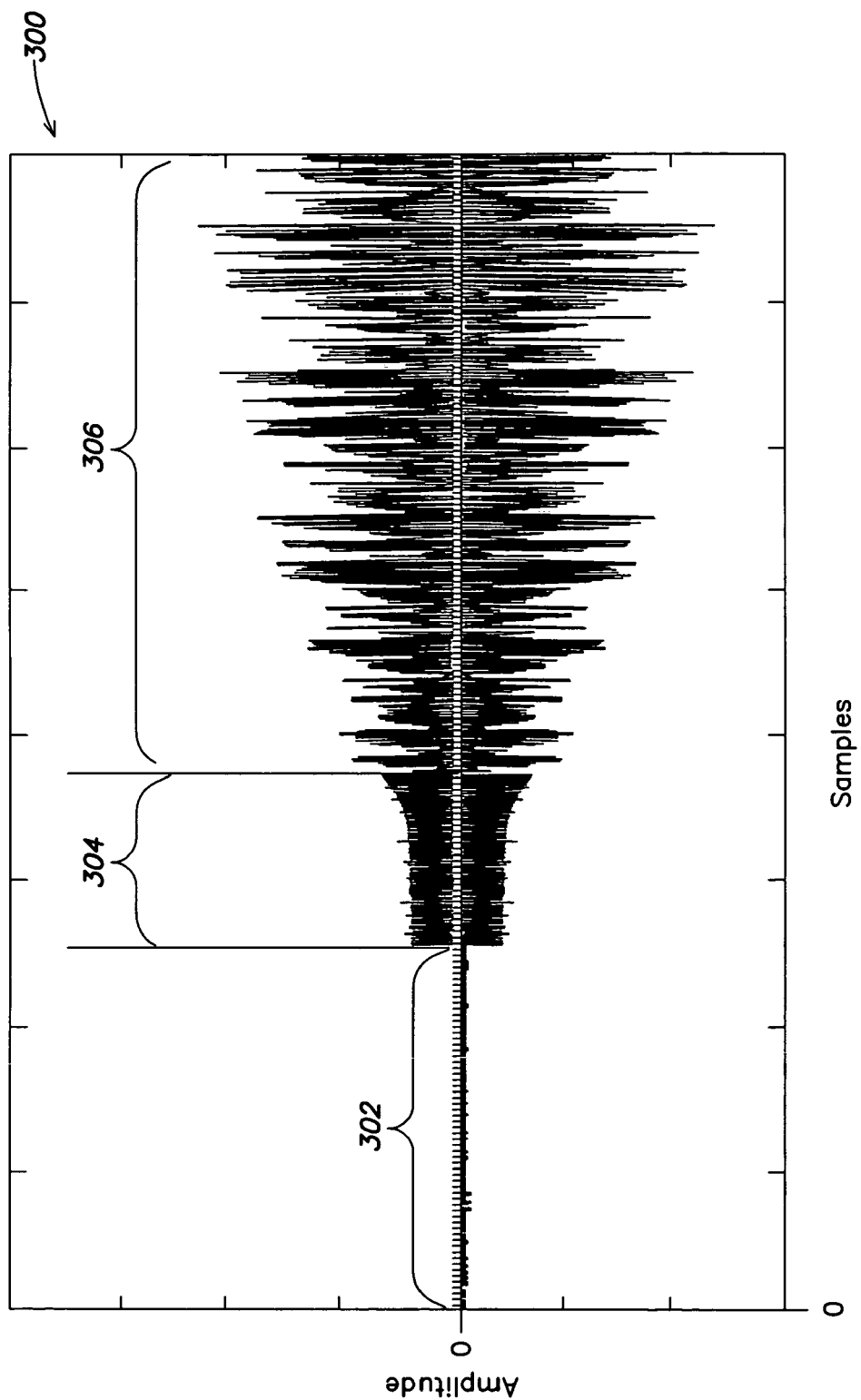
FIG. 3 is an illustration of an electromagnetic signal received by a user device, according to some embodiments of the invention.

FIG. 3 is an illustration of an electromagnetic signal received by a transmitter, according to some embodiments of the invention. The vertical axis of graph 300 represents the amplitude detected by a transmitter and the horizontal access represents the number of samples detected. As shown in graph 300, the first several samples detect only channel noise 302 followed by the detection of a transient portion 304 of a signal and another portion 306 of the signal (the remainder of the signal continues beyond the right edge of FIG. 3).

Fingerprint determination module 212 may be configured to determine a transmitter fingerprint of the signal represented in graph 300 by transient portion 304 and portion 306. In some embodiments, this determination may include extracting the transient portion 304 from the signal, as the transient portion of an electromagnetic signal is known to manifest characteristics of a transmitter that uniquely distinguish the transmitter from other transmitters, even those manufactured by the same manufacturer. One or more features, characteristics, properties, etc. (hereinafter "properties") of the transient portion may be determined. For example, the amplitude, phase, frequency, and derivatives of these properties may be determined. It may be desirable to determine properties that have a relatively high variability between transmitters and/or have a relatively low variability between transmissions from a same transmitter. Information elements determined for a transmitter fingerprint may include any of: frequency; amplitude; phase; standard deviation of normalized amplitude; standard deviation of normalized phase; standard deviation of normalized frequency; variance of change in amplitude; standard deviation of normalized n-phase data; standard deviation of normalized quadrate data; standard deviation of normalized amplitude (mean centered; power per section; standard deviation of phase (normalized using a mean); average change in Discrete Wavelet Transform (DWT) co-efficient; other information elements; and any combination of the foregoing. Several of these information elements are described in more detail in the Hall Paper.

Wireless communications are often effected by noise and interference, which may result in undesirable variability between signals from a same transmitter. Accordingly, in some embodiments of the invention, any of a variety of techniques may be used to minimize to the extent possible the effects of noise and interference. For example, a Bayesian filter may be used to probabilistically estimate the state of a system from noisy observations, for example, as described in the Hall paper.

Returning to FIG. 2, it should be appreciated that an AP may include multiple transmitters, each having a unique transmitter fingerprint. Accordingly, fingerprint determination module may be configured to determine a transmitter fingerprint for each transmitter. This may involve determining multiple transmitter fingerprints from a single signal 202 (e.g., using signal processing techniques to separate portions of the signal attributed to each transmitter and/or determining transmitter fingerprints from different signals that may be received by one or more transmitters of signal processing circuitry 206 in parallel or serially. The fingerprint set 218 determined by fingerprint determination module 212 may be sent to recording module 220, which then may record the set (illustrated as set 232 in FIG. 2) in fingerprint table 236.

Figure 4:
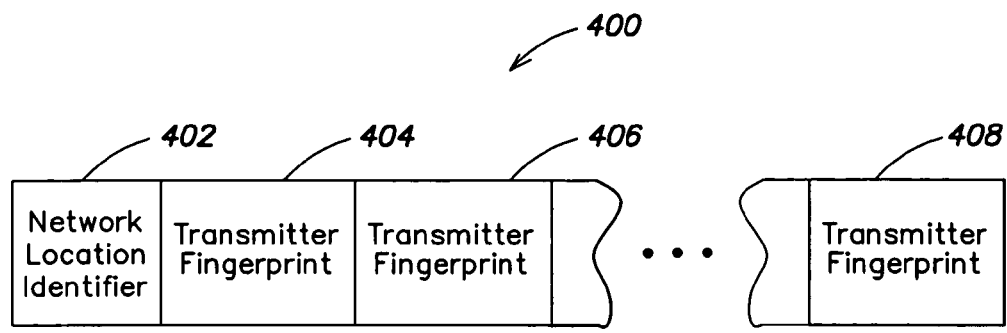
FIG. 4 is a block diagram illustrating an example of an entry of a fingerprint table, according to some embodiments of the invention.

Digressing briefly again from FIG. 2, FIG. 4 is a block diagram illustrating an example of an entry 400 of a fingerprint table, according to some embodiments of the invention.

Entry 400 is merely an illustrative embodiment of an entry of a fingerprint table and is not intended to limit the scope of the invention. Any of numerous other implementations of such a table, for example, variations of table 400, are possible and are intended to fall within the scope of the invention. Further, the invention is not limited to storing transmitter fingerprint sets in a table. Any of a variety of other types of data structures may be used such as, for example, an object-oriented structure.

Each entry may include a plurality of fields including any of: network location ID field 402; one or more transmitter fingerprint fields 404, 406 and 408 (defining a set); other fields; and any suitable combination of the foregoing. Network location ID field 402 may hold any type of identifier that uniquely identifies a network location such as, for example, a numeric identifier; an alpha-numeric identifier; a name; or any suitable combination of the foregoing, e.g., "work", "home", "coffee shop", "airport hot", etc.

It should be appreciated that each of transmitter fingerprint fields 404, 406 and 408 can hold multiple information elements themselves, for example, any of the information elements of transmitter fingerprints described above.

In some embodiments, information source 235 may include another table or other type of data structure, in which each entry corresponds to an AP, and includes an AP identifier and one or more transmitter fingerprints corresponding to the AP.

Returning to FIG. 2, although the determining of a fingerprint set is described above as occurring in response to the checking module determining that the fingerprint table 236 is empty, the invention is not so limited. Alternatively, fingerprint determination module 212 may automatically determine a fingerprint set in response to a signal being received, and the determination that the fingerprint table 236 is empty may trigger the recording of the fingerprint (as opposed to triggering the determination).

Further, other events may trigger the determination and/or recording of a fingerprint set. For example, a transmitter fingerprint set of a network location may be recorded (for future use) in response to determining that the set does not match any of the sets of fingerprints stored in table 236. Further, a set of determined transmitter fingerprints may be recorded in response to determining that, even though the set matches a set in one of the entries of fingerprint table 236, the similarity of the match is below a re-recording threshold 240. The similarity between sets of transmitter fingerprints may be considered a match if it exceeds a matching threshold 238. However, even if sets of fingerprints match, thereby positively identifying a network location, the similarity may be low enough to indicate that the transmitter fingerprints of the set have changed to the extent that they should be re-recorded. A transmitter fingerprint of a transmitter may change as a result of physical changes to the transmitter. A re-recording threshold 240 may be used to set the threshold below which the fingerprint set of a network location should be re-recorded or updated.

In some embodiments of the invention, entries in the fingerprint table 236 may be updated by combining values of information elements (e.g., properties) from a most recently determined transmitter fingerprint set with the values of the information elements of a transmitter fingerprint set already stored in the entry. This may be done periodically or in response to particular events. The combining operation may include determining averages of values, which reflects that fingerprint properties of a transmitter may vary slightly in response to environmental conditions and/or physical changes to the transmitter over time. Accordingly, average values of transmitter fingerprints detected over time may be a best indicator of a transmitter fingerprint of a transmitter.

In some embodiments of the invention, a user may be able to control when a transmitter fingerprint set of a network location is recorded. For example, user interface 230 may enable a user to initiate the recording of a transmitter fingerprint. User interface 230 may be provided in response to a user selection or in response to any of the events described above for when a transmitter fingerprint is determined and/or recorded.

As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

The user interface may define how information is visually presented (i.e., displayed) to the user, and defines how the user can navigate the visual presentation (i.e., display) of information and input information in the context of the visual presentation. During execution of the application, the user interface may control the visual presentation of information and enable the user to navigate the visual presentation and enter information in the context of the visual presentation. Types of user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces. As used herein, the visual presentation of information presented by a user interface or GUI is referred to as a "user interface display" or a "GUI display", respectively.

User interface 230 may provide one or more windows on a user interface display (e.g., a GUI display) that provide the user the option of recording a transmitter fingerprint set of a wireless access point. For example, the window may display to the user the current circumstances (e.g., fingerprint table is empty, no matching entry found, or match is below a re-record threshold) in terms understandable to the user, and ask the user if the user wants to record the a transmitter fingerprint set. Check boxes, radio buttons or other controls may be provided to allow the user to manifest the user's decision using a mouse, keyboard, or any of a variety of other types of user input devices. Fingerprint determination module 212 and recording module 220 may be configured to determine and record transmitter fingerprint sets, respectively, in response to the user input.

User interface 230 also may be configured to notify the user whenever a transmitter fingerprint set is going to be determined and compared to known fingerprint sets by fingerprint module 210. The user may be presented with the option of going forward with the determination and comparison or foregoing one or both functions. It may be desirable to forego these functions if the user is in an environment (e.g., the user's home) at which the user believes the identification of the AP is not necessary (although foregoing the identification may be risky).

As described above, another primary function of fingerprint module 210 is to determine an identity of a network location based at least in part on a transmitter fingerprint set determined from at least one signal transmitted by at least one entity at the network location. For example, referring to FIG. 1, when a user device moves from one of the network locations illustrated in FIG. 1 to another network location and the user device attempts to establish contact with a network, fingerprint module 210 may be configured to determine whether the current network location is known to the user device based, at least in part, on a transmitter fingerprint set determined from the signal (or a plurality of signals).

For each of the at least one entity at the network location, fingerprint determination module 210 may determine a transmitter fingerprints of the entity over a period of time, which may be predefined according to a suitable duration to allow each transmitter of the entity to broadcast a signal. For example, a transmitter fingerprint of an entity may be determined from one or more signals 202 if multiple transmitters (e.g., transceivers) are present in the entity, which can be determined from raw signal information 208 derived from the one or more signals. Module 212 may generate a transmitter fingerprint set from the one or more determined fingerprints, and pass the transmitter fingerprint set to identification module 226, which may be configured to compare the determined transmitter fingerprint set to known transmitter fingerprint sets to determine if the current network location is known to the user device.

Identification module 226 may be configured to compare the transmitter fingerprint set 216 to the transmitter fingerprint sets of each entry of fingerprint table 236. This comparison may be made using any of a variety of known techniques such as those described in the Hall paper. An entry may be considered to match the transmitter fingerprint set 216 when the similarity between the transmitter fingerprint set 216 and that of the entry are above a matching threshold 238. Matching threshold 238 should be set high enough to avoid too many false positives and low enough to accommodate the differences in transmitter fingerprints determined at different times for a same transmitter.

In some embodiments, an entry might be considered to match the transmitter fingerprint set 216 when the similarity between at least one transmitter fingerprint of the set 216 and at least one transmitter fingerprint of the entry are above a matching threshold 238. In some embodiments, an entry may be considered a match only if all of the transmitter fingerprints of set 216 match all of the transmitter fingerprints of the entry.

The matching threshold 238 and re-record threshold 240 may be provided by a user of the user device 204 through user I/O device 228 and user device 230.

It should be appreciated that the transmitter fingerprint set of a network location is not the only way by which the entity can be identified, but may be used in conjunction with other identification techniques, such as malleable identification techniques described above (e.g., use of a MAC address).

The result of determining whether the current network location is a network location known to the user device, based at least in part on a transmitter fingerprint set determined from a signal transmitted from the entity, may be used to determine what information may be divulged in any communication exchanged with the entity. One or more applications 222 may be configured to share certain information with only certain networks (e.g., one or more APs and/or other elements of the one or more networks). Thus, application behavior and functionality, including security behavior, may depend on the identity of the AP to which the user device is connected and/or the network location of the user device. Application behavior and functionality may be controlled by setting values of certain parameters, enabling/disabling uses of certain logical ports, and by other techniques. Applications 222 may include any of a variety of types of applications, including, but not limited to, network applications and host firewalls.

For example, if it is determined that the network location is that of a user device's home network (e.g., AP 109 of home network 108), then one or more applications 222 on user device 204 may share information relatively liberally with the network. That is, relatively lax security measures may be imposed by applications in sharing information with the AP or other network elements, such as files, documents, video, pictures, music, private information, etc.

In contrast, if the network location is that of a public hot spot (e.g., AP 107 of Internet 106), then one or more applications 222 may be configured to share information relatively conservatively with the identified AP and other network elements. That is, more security may be employed by the user device reflecting the lower trust in the hotspot. Further, if the network location cannot be identified by its transmitter fingerprint set, then one or more applications 222 may be configured to share information relatively conservatively as well, for example, by sharing a minimal amount of information necessary to enable communications. Further, as described above in relation to recording transmitter fingerprint sets, if the network location cannot be identified, then the transmitter fingerprint of the network location may be recorded for future use.

In some embodiments of the invention, the network location may be used as part of Network Location Awareness (NLA) technologies such as, for example, those available from Microsoft Corporation. For example, the operation system of the user device may include an NLA service that allows one or more applications 222 to behave in accordance with the network location identified by the NLA service. In such embodiments, the identification of the network location determined based on its transmitter fingerprint set may be used to determine the globally-unique identifier (GUID) defined by the NLA service.

Systems 100 and/or 200, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on separate, discrete devices. Further, each component may be distributed across multiple devices, and one or more of the devices may be interconnected.

Further, on each of the one or more devices that include one or more components of system 100 and/or 200, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100 and/or 200, and components thereof, may be implemented using a computer system such as that described below in relation to FIGS. 7 and 8.

Figure 5:
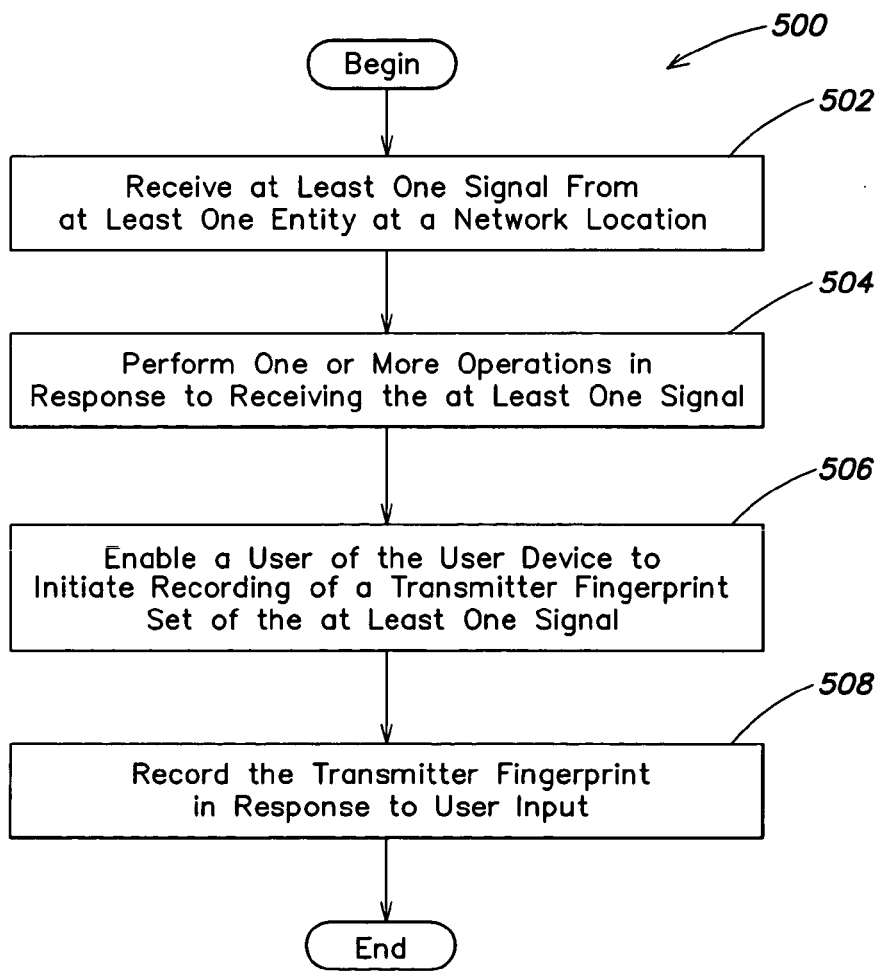
FIG. 5 is a flow chart illustrating an example of a method of recording one or more transmitter fingerprint sets of a wireless access point, according to some embodiments of the invention.

FIG. 5 is a flow chart illustrating an example of a method 500 of recording a transmitter fingerprint set of a network location, according to some embodiments of the invention. Method 500 is merely an illustrative embodiment of a method of recording a transmitter fingerprint set of a network location, and is not intended to limit the scope of the invention. Other implementations of such a method, for example, variations of method 500 are possible and are intended to fall within the scope of the invention.

In Act 502, at least one signal may be received from at least one entity (e.g., an AP, network device, or user device independent of a network) at the network location, and in Act 504, one or more operations may be performed in response to receiving the signal(s), for example, one or more of the operations described above in relation to FIG. 2. These operations may include: determining if a fingerprint table is empty; determining a transmitter fingerprint set of the at least one signal; determining that the fingerprint set does not match any fingerprint sets known by the user device; determining that the similarity of the determined fingerprint set to any of the known sets does not exceed a re-record threshold; other operations; or any suitable combination of the foregoing.

In Act 506, a user of the user device may be enabled to initiate recording of a transmitter fingerprint set of the network location. For example, as described above in relation to FIG. 2, a user interface may be provided that enables the user to initiate the recording.

In Act 508, the transmitter fingerprint set may be recorded in response to input from a user, for example, through user interface 230, as described above in relation to FIG. 2.

Method 500 may include additional acts. Further, the order of the acts performed as part of method 500 is not limited to the order illustrated in FIG. 5, as the acts may be performed in other orders and/or one or more of the acts may be performed in series or in parallel, at least partially.

Figure 6:
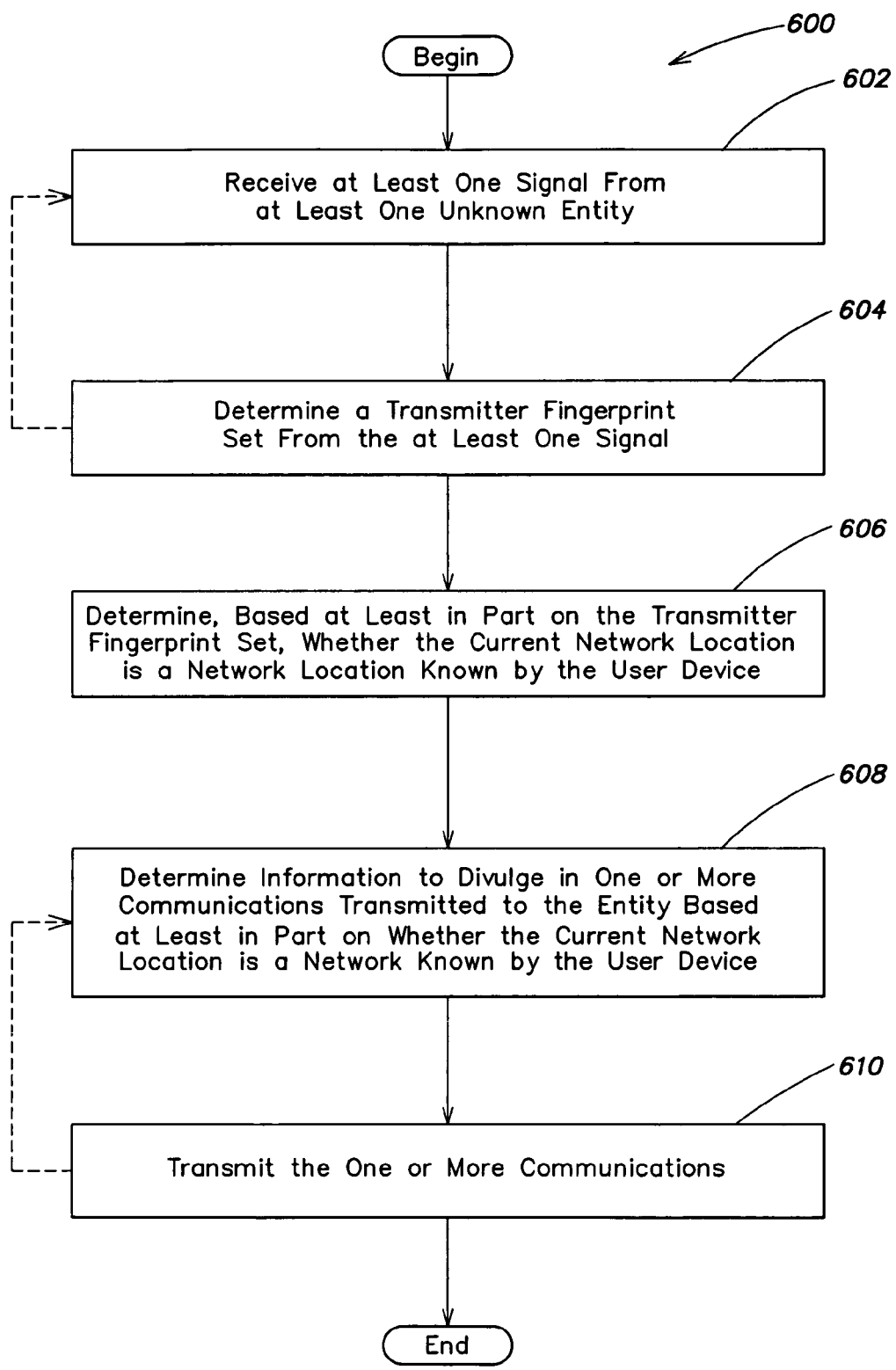
FIG. 6 is a flow chart illustrating an example of a method of determining, based at least in part on a transmitter fingerprint set determined at a current network location, whether the network location is a wireless access point having an identity known by a user device, according to some embodiments of the invention.

FIG. 6 is a flow chart illustrating an example of a method 600 of determining, based at least in part on a transmitter fingerprint set determined at a current network location, whether the current network location is a network location known by a user device, according to some embodiments of the invention. Method 600 is merely an illustrative embodiment of a method of determining whether a current network location is a network location known by a user device, and is not intended to limit the scope of the invention. Other implementations of such a method, for example, variations of method 600, are possible and are intended to fall within the scope of the invention.

In Act 602, at least one signal may be received from at least one unknown entity (i.e., unknown at the time the at least one signal is initially received), and a transmitter fingerprint set may be determined from the at least one signal in Act 604, for example, as described above in relation to fingerprint determination module 212 of system 200.

In Act 606, based at least in part on the transmitter fingerprint set, it may be determined whether the current network location is a network location known by the user device, for example, as described above in relation to identification module 226.

In Act 608, information to divulge in one or more communications transmitted to the at least one entity may be determined, based at least in part on whether the current network location is a network location known by the user device, for example, as described above in relation to system 200. For example, information may be divulged based on the determination that the entity is a wireless access point having an identity known by the user device.

In Act 610, the one or more communications may be transmitted to the entity. Acts 608 and 610 may be repeated several times, for example, at different network locations.

In some embodiments, in conjunction with method 600, or independently thereof, it may be determined, based at least in part on a transmitter fingerprint corresponding to an entity, whether the entity is a wireless access point having an identity known by a user device. At least one signal may be received from an unknown entity, and a transmitter fingerprint may be determined from the at least one signal. Based at least on part on the determined transmitter fingerprint, it may be determined whether the entity is a wireless access point having an identity known by the user device. Information to divulge in one or more communications transmitted to the entity may be determined, based at least in part on whether the entity is a wireless access point having an identity known by the user device. One or more communications then may be transmitted to the entity based on this determination.

Method 600 may include additional acts. Further, the order of the acts performed as part of method 600 is not limited to the order illustrated in FIG. 6, as the acts may be performed in other orders and/or one or more of the acts may be performed in series or in parallel, at least partially. Further, one or more of the acts of method 600 may be performed in parallel, at least partially, to one or more acts of method 500.

Methods 500 and 600, and acts thereof, and various embodiments and variations of these methods and these acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., methods 500 or 600 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 200, 700 and 800 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 7:
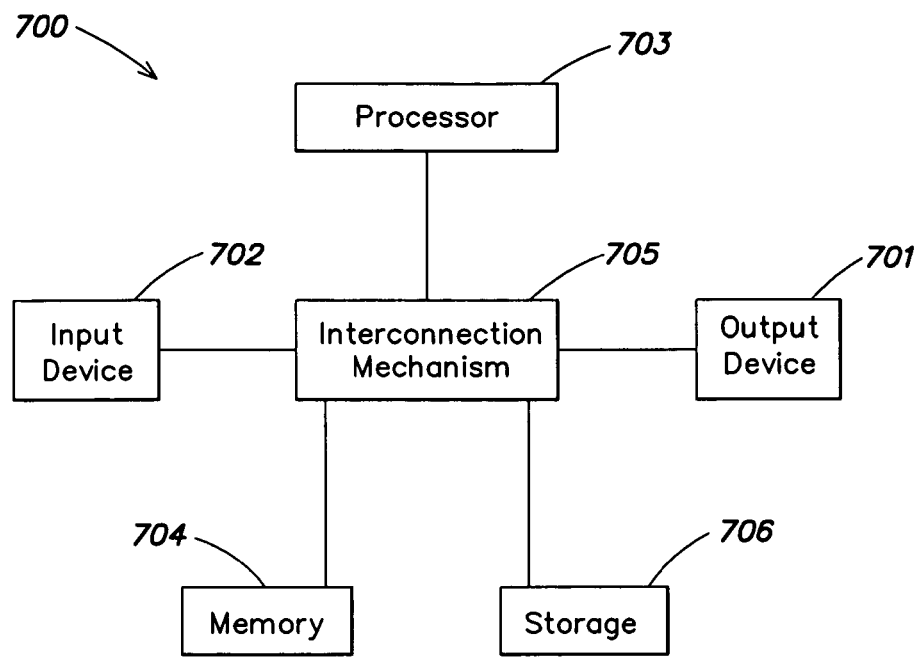
FIG. 7 is a block diagram illustrating an example of a computer system on which some embodiments of the invention may be implemented.
Figure 8:
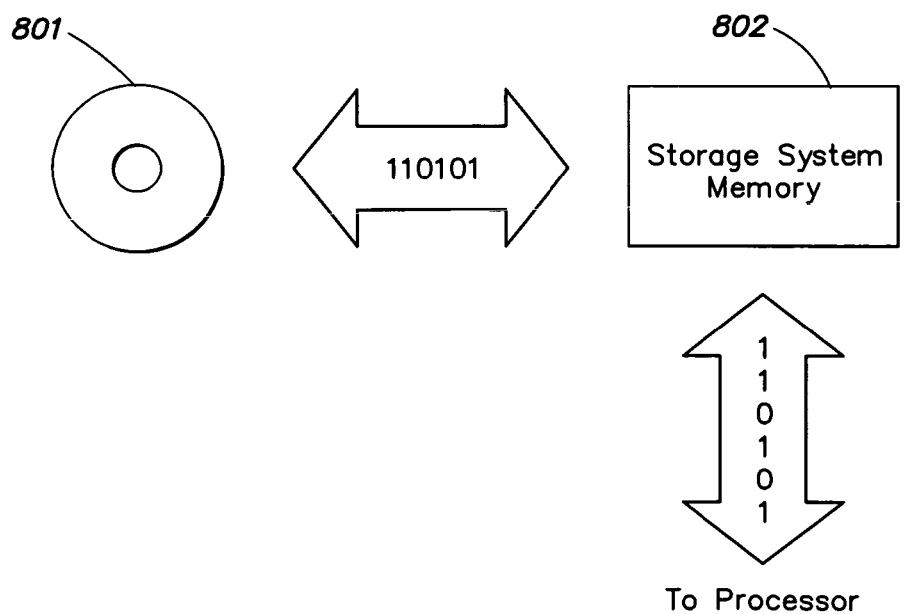
FIG. 8 is a block diagram illustrating an example of a storage system that may be used as part of the computer system to implement some embodiments of the invention.

It should be appreciated that any single component or collection of multiple components of a computer system, for example, any of the computer systems described in relation to FIGS. 2, 7 and 8, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 700 such as that shown in FIG. 7. The computer system 700 may include a processor 703 connected to one or more memory devices 704, such as a disk drive, memory, or other device for storing data. Memory 704 is typically used for storing programs and data during operation of the computer system 700. Components of computer system 700 may be coupled by an interconnection mechanism 705, which may include one or more busses (e.g., between components that are integrated within a same machine) and/or a network (e.g., between components that reside on separate discrete machines). The interconnection mechanism 705 enables communications (e.g., data, instructions) to be exchanged between system components of system 700. Computer system 700 also includes one or more input devices 702, for example, a keyboard, mouse, trackball, microphone, touch screen, and one or more output devices 701, for example, a printing device, display screen, speaker. In addition, computer system 700 may contain one or more interfaces (not shown) that connect computer system 700 to a communication network (in addition or as an alternative to the interconnection mechanism 705).

The storage system 806, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a dynamic random access memory (DRAM) or static memory (SRAM). It may be located in storage system 706, as shown, or in memory system 704, not shown. The processor 703 generally manipulates the data within the integrated circuit memory 704, 802 and then copies the data to the medium 801 after processing is completed. A variety of mechanisms are known for managing data movement between the medium 801 and the integrated circuit memory element 704, 802, and the invention is not limited thereto. The invention is not limited to a particular memory system 704 or storage system 706.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the invention may be practiced, it should be appreciated that aspects of the invention are not limited to being implemented on the computer system shown in FIG. 7. Various aspects of the invention may be practiced on one or more computers having a different architecture or components that that shown in FIG. 7.

Computer system 700 may be a general-purpose computer system that is programmable using a high-level computer programming language. Computer system 700 also may be implemented using specially-programmed, special-purpose hardware. In computer system 700, processor 703 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of operating a user device for processing at least one signal received from at least one transmitter of at least one entity over a wireless transmission medium, the method comprising:

(a) determining, at the user device, a transmitter fingerprint set from the at least one signal generated and transmitted by the at least one transmitter of the at least one entity, the transmitter fingerprint set being based on one or more non-data content, physical properties of a transient portion of the at least one signal which uniquely distinguish the at least one transmitter from other transmitters; and (b) determining, at the user device, based at least in part on the transmitter fingerprint set, whether a current network location of the user device is a network location known by the user device, wherein the one or more non-data content, physical properties are of the transient portion of each of the at least one signals and wherein the one or more non-data content, physical properties comprise at least one of frequency, amplitude, phase, standard deviation of normalized amplitude, standard deviation of normalized phase, standard deviation of normalized frequency, variance of change in amplitude, standard deviation of normalized in-phase data, standard deviation of normalized quadrature data, power per section, standard deviation of phase, and average change in Discrete Wavelet Transform (DWT) co-efficient.

2. The method of claim 1, further comprising:

(c) determining information to divulge in one or more communications to transmit to one or more entities of the at least one entity based, at least in part, on the determination of whether the current network location is a network location known by the user device.

3. The method of claim 2, wherein the act (b) comprises determining that the current network location is a network location known to the user device, and
wherein the act (c) comprises determining the information based, at least in part, on the known network location.

4. The method of claim 1, wherein the act (b) comprises determining, based at least in part on the transmitter fingerprint set, that one of the at least one entity is a wireless access point having an identity known to the user device.

5. The method of claim 4, further comprising:

(c) determining information to divulge in one or more communications transmitted to the wireless access point based, at least in part, on the identity of the wireless access point.

6. The method of claim 1, wherein the act (b) further comprises determining whether the transmitter fingerprint set matches any transmitter fingerprint set known by the user device.

7. The method of claim 6, wherein the act (b) comprises:
accessing an information source that includes at least one entry, each entry specifying an identity of a network location and a transmitter fingerprint set of the network location; and
comparing the determined transmitter fingerprint set to the transmitter fingerprint set of one or more of the at least one entry.

8. The method of claim 7, wherein the comparing comprises determining, for each of the one or more entries, whether a similarity between the determined transmitter fingerprint set and the transmitter fingerprint set of the entry exceeds a predefined threshold.

9. The method of claim 7, wherein the comparing includes, for each of the one or more entries, determining whether at least one transmitter fingerprint of the determined transmitter fingerprint set matches at least one transmitter fingerprint included in the entry.

10. The method of claim 9, wherein the comparing includes, for each of the one or more entries, determining whether all of the transmitter fingerprints of the determined transmitter fingerprint set matches all of the transmitter fingerprints included in the entry.

11. A computer-readable storage medium encoded with computer-executable instructions that, as a result of being executed by a computer, instruct the computer to perform a method of operating a user device for processing at least one signal transmitted on a wireless transmission medium from a transmitter of an entity, an identity of the entity being unknown to the user device at a time at which the at least one signal is received, the method comprising:

(a) determining a transmitter fingerprint from the at least one signal generated and transmitted by the transmitter of the entity, the transmitter fingerprint being based on one or more physical properties of a transient portion of the at least one signal which uniquely distinguish the transmitter from other transmitters, wherein the one or more physical properties comprise at least one of frequency, amplitude, phase, standard deviation of normalized amplitude, standard deviation of normalized phase, standard deviation of normalized frequency, variance of change in amplitude, standard deviation of normalized in-phase data, standard deviation of normalized quadrature data, power per section, standard deviation of phase, and average change in Discrete Wavelet Transform (DWT) co-efficient;

(b) determining, based at least in part on the transmitter fingerprint, whether the entity is a wireless access point having an identity known by the user device, wherein the act (b) comprises:

(1) accessing an information source that includes one or more entries, each of the entries specifying an identity of a wireless access point and a transmitter fingerprint of the wireless access point;

(2) comparing the determined transmitter fingerprint to the transmitter fingerprint of the one or more entries; and (3) determining the identity of the wireless access point based on a match between the determined transmitted fingerprint and an entry in the information source; and (c) determining information to divulge in one or more communications transmitted to the entity based, at least in part, on the determination of whether the entity that transmitted the signal is a wireless access point having an identity known by the user device.

12. The computer-readable storage medium of claim 11, wherein the act (b) comprises determining that the entity is a wireless access point having an identity known to the user device, and
wherein the act (c) comprises determining the information based, at least in part, on the identity.

13. The computer-readable storage medium of claim 11, wherein the act (b) comprises determining that the entity is a wireless access point having an identity known to the user device, the method further comprising:

(d) determining a network location of the user device based at least in part on the identity.

14. The computer-readable storage medium of claim 13, wherein the method further comprises:

(e) determining information to divulge in one or more communications transmitted to the wireless access point based, at least in part, on the determined network location.

15. The computer-readable storage medium of claim 11, wherein the comparing comprises determining, for each of the one or more entries, whether a similarity between the determined transmitter fingerprint and the transmitter fingerprint of the entry exceeds a predefined threshold.

16. A system for processing, for a user device, at least one signal received from at least one transmitter of at least one entity over a wireless transmission medium, the system comprising:

a processor configured to execute software modules, the software modules comprising:

a fingerprint determination module to determine a transmitter fingerprint set from the at least one signal generated and transmitted by the at least one transmitter of the at least one entity, the transmitter fingerprint set being based on one or more non-data content, physical properties of a transient portion of the at least one signal which uniquely distinguish the at least one transmitter from other transmitters; and an identification module to determine, based at least in part on the transmitter fingerprint set, whether a current network location of the user device is a network location known by the user device, wherein the one or more non-data content, physical properties comprise at least one of frequency, amplitude, phase, standard deviation of normalized amplitude, standard deviation of normalized phase, standard deviation of normalized frequency, variance of change in amplitude, standard deviation of normalized in-phase data, standard deviation of normalized quadrature data, power per section, standard deviation of phase, and average change in Discrete Wavelet Transform (DWT) coefficient.

17. The system of claim 16, wherein the identification module is operative to determine whether the transmitter fingerprint set matches any transmitter fingerprint set known by the user device.

* * * * *